United States Patent [19]

Bogard et al.

[11] 3,772,703
[45] Nov. 13, 1973

[54] NORMALIZED DECORRELATION DETECTOR

[75] Inventors: James R. Bogard, Orlando; Gordon W. Boyles, Winter Park, both of Fla.

[73] Assignee: The United States of America as represented by the Secretary of the Air Force

[22] Filed: Feb. 15, 1972

[21] Appl. No.: 226,574

[52] U.S. Cl............................. 343/100 CL, 343/7.3
[51] Int. Cl............................................... G01s 9/14
[58] Field of Search............ 343/7.3, 5 DP, 100 CL

[56] References Cited

UNITED STATES PATENTS 3,005,165  10/1961  Lenigan .............................. 343/7.3
3,500,302  3/1970  Moss, Jr. et al. .................... 343/7.3
3,618,085  11/1971  Hall .................................... 343/7.3

Primary Examiner—Samuel Feinberg
Assistant Examiner—G. E. Montone
Attorney—Harry A. Herbert, Jr. et al.

[57] ABSTRACT

A range closure detector in which new data and data from memory feeds an AND gate and triggers a monostable multivibrator which engables the same AND gate and also a feedback analog gate. The outputs of both gates are summed in a summing amplifier fed to an integrator and then fed back to the feedback analog gate. The correlation output is taken from the integrator which is also fed to the threshold circuits for use in other commands.

3 Claims, 5 Drawing Figures

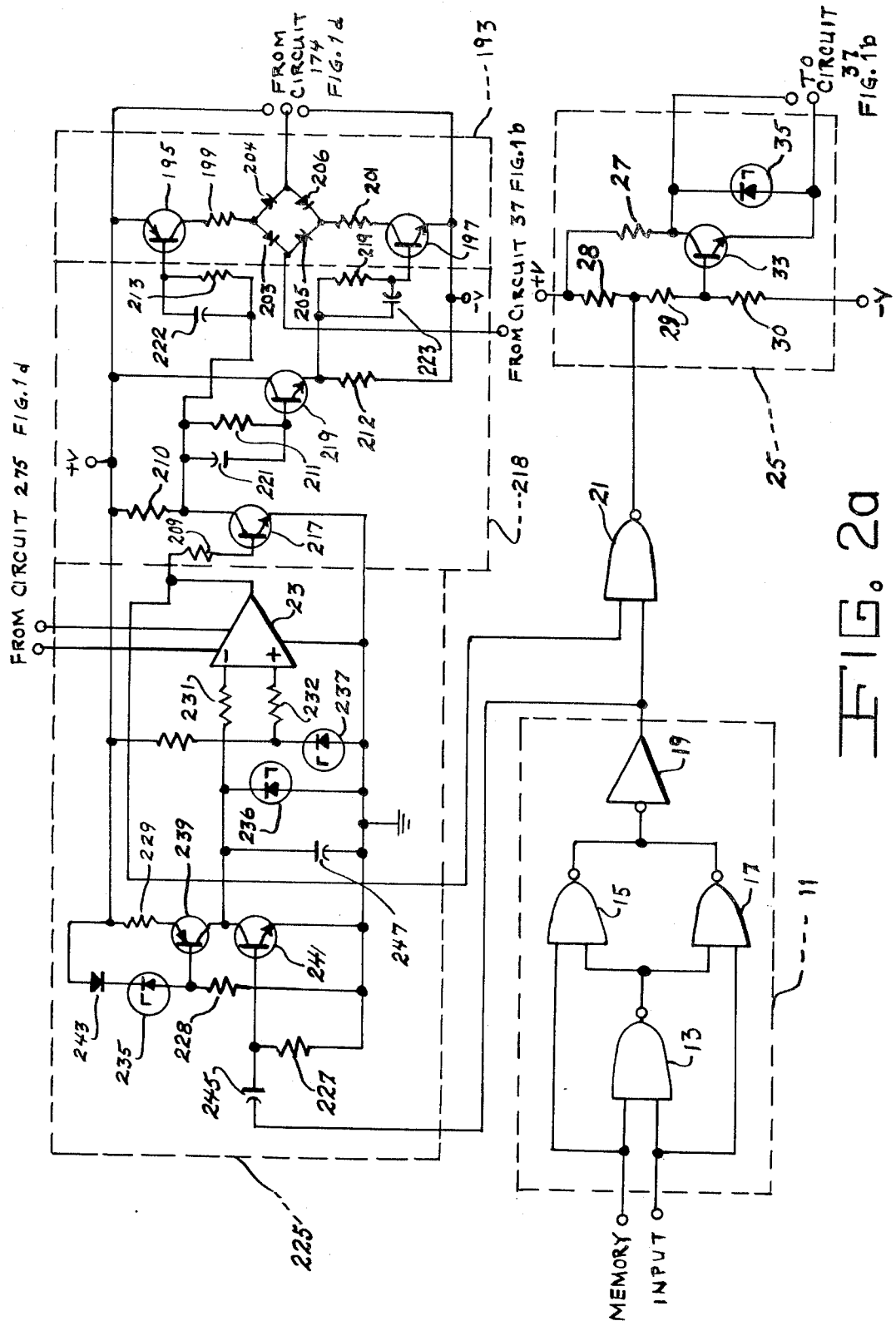

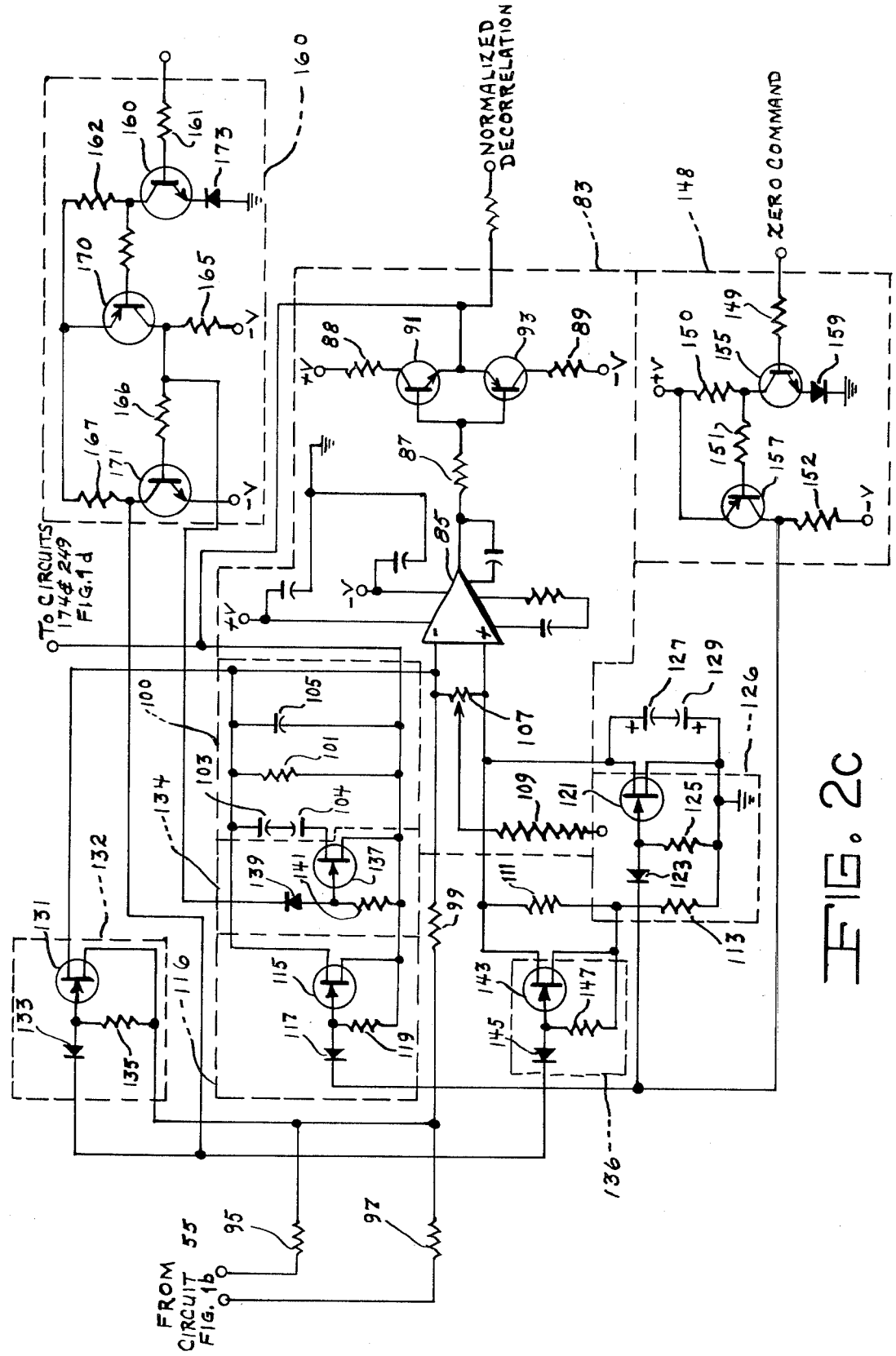

FIG. 2d

NORMALIZED DECORRELATION DETECTOR

BACKGROUND OF THE INVENTION

The invention relates to tracking systems, and more particularly to a correlation range closure system for use in missile systems.

The prior art range closure systems were upredictable, subject to noise, less linear in output, and also less active in detecting range closure. It was needed to provide a system to linearly detect range closure, independent of other factors such as data rate, body motions, and target characteristics, and to quickly recognize the correct target boresight angle during aircraft pitch-over also with the necessary independence.

SUMMARY OF THE INVENTION

The initial sensing is performed with an exclusive OR gate which passes all "disagreements" between memorized data and current data read from the system memory. An acceptance gate which follows passes data widths up to 400 μsec, thereby allowing linear operation up to a reasonable limit, but rejecting any single "large" data pulse which would dominate the answer, i.e., each data edge is given an approximately equal "vote."

The closed loop circuit following the acceptance gate is the "normalizing" portion of the system. During each data sample, the loop is closed for 400 μsec, thereby allowing the forward-loop filter to take a partial charge, or discharge, depending on the width of the forcing data pulse. The time constant is set by the internal gain of the closed loop, whereby the data is filtered over a prescribed number of tracker data scans. An output voltage therefore arrives at a value which is a measure of the average pulse-edge disagreement, independent of the number of pulses in any given scan, and linear up to a saturation point of 400 μsec average pulse width. It follows also that the output voltage is a nearly smooth DC signal, because the forward loop filter holds all DC values between data samples.

Two time constant modes can be used. The fast-charge mode is used in the acquisition-search mode, during which the bore-sight target must be quickly detected and locked. The slow-charge mode is used for rejection of false acquisitions, and for automatic rememorization during flight.

The final element, the threshold detector, serves simply to send a switching command at those levels of output voltage where automatic rememorization or acquisition modes are actuated.

It is therefore an object of the invention to provide a novel and improved range closure system using a normalized decorrelation detector.

It is also an object to provide a range closure system that is more predictable and less subject to noise.

It is still another object to provide a range disclosure system which has a linear output.

These and other objects, features and advantages of the invention will become more apparent when taken in connection with the illustrative embodiment in the accompanying drawings.

DESCRIPTION OF DRAWINGS

Figure 2D:
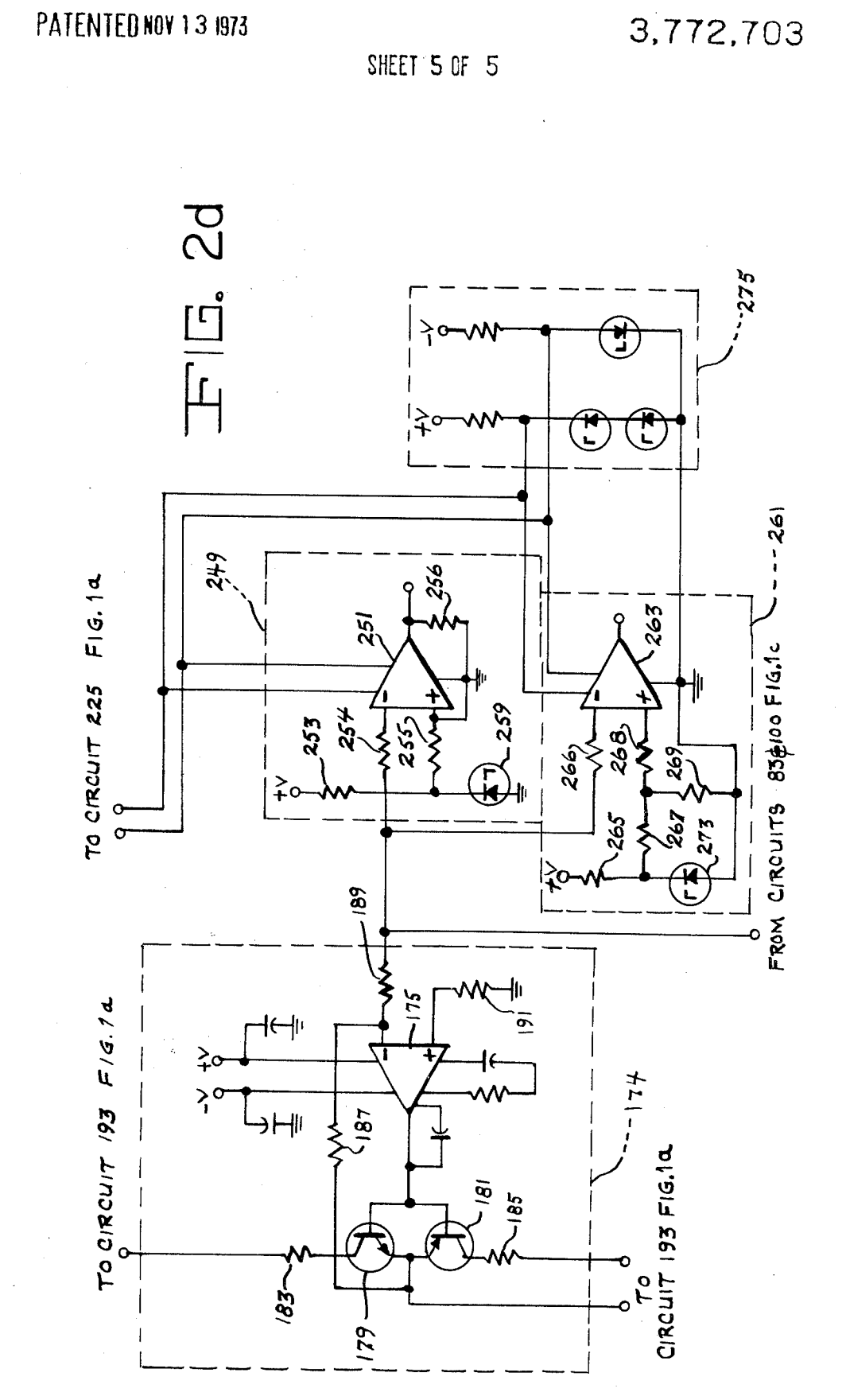

FIG. 2A through 2D is a circuit diagram showing an embodiment of the invention.

Referring to FIG. 1 which shows the basic concept of the invention, the new incoming data and the memory data are fed to exclusive OR circuit 11 whose output is fed to monostable multivibrator 225 and AND gate 21. The output of AND gate 21 is fed to logic level stage or clamping circuit 25 and is summed in summing amplifier 37 with the output of analog gate 193. The sum is then fed to DC restoring circuit 55 and then to operational amplifier integrator 83. The output thereof representing correlation is also fed back to summing circuit 37 through analog gate 193 which is enabled by monostable multivibrator 225.

Referring to FIG. 2A through 2D, the new incoming data and the old data or memory is fed to amplifying exclusive OR gate 11 which includes NOR gate 13 which then feeds into NOR gates 15 and 17 the output thereof being fed to amplifier 19. The outputs of circuit 11 are pulse pairs whose widths are equal to the time disagreement between new data and the old data inputs. AND gate 21 is fed by the output of OR gate 11 and resettable monostable multivibrator 225 which is triggered by exclusive OR gate 11. The function of AND gate 21 is to allow passage of error pulses from exclusive OR gate 11 to a maximum error pulse width equal to the period of monostable multivibrator 225. The output of AND gate 21 is coupled to logic level stage 25 which includes resistors 27–30, transistor 33, and Zener diode 35 which is the clamping element. The output of Zener diode 35 is coupled to one input of forward summing amplifier circuit 37 which includes amplifier 39, resistors 41–47, and transistors 49 and 51. Forward summing amplifier circuit 37 is an operational amplifier with a closed loop gain of one (1) whose output is equal to the sum of the voltage at point 53.

Figure 1:
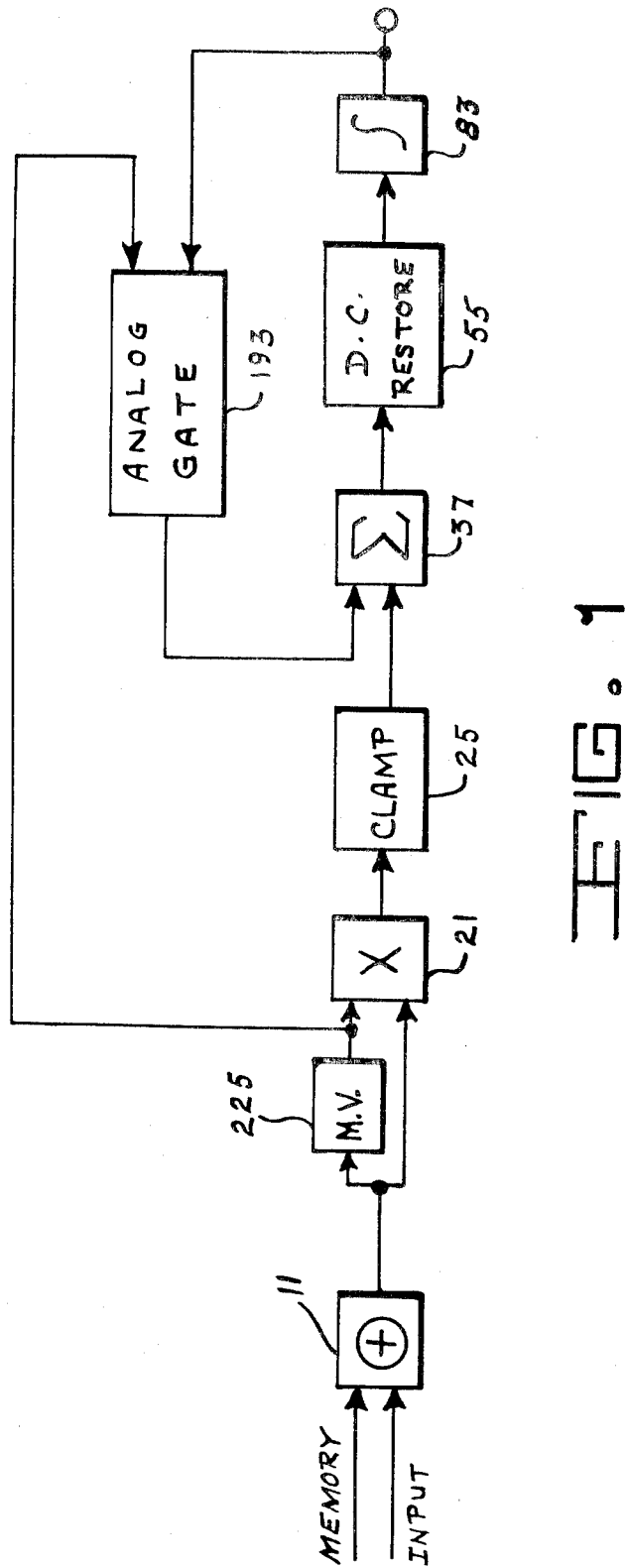
FIG. 1 is a basic block diagram of the invention.
Figure 2B:
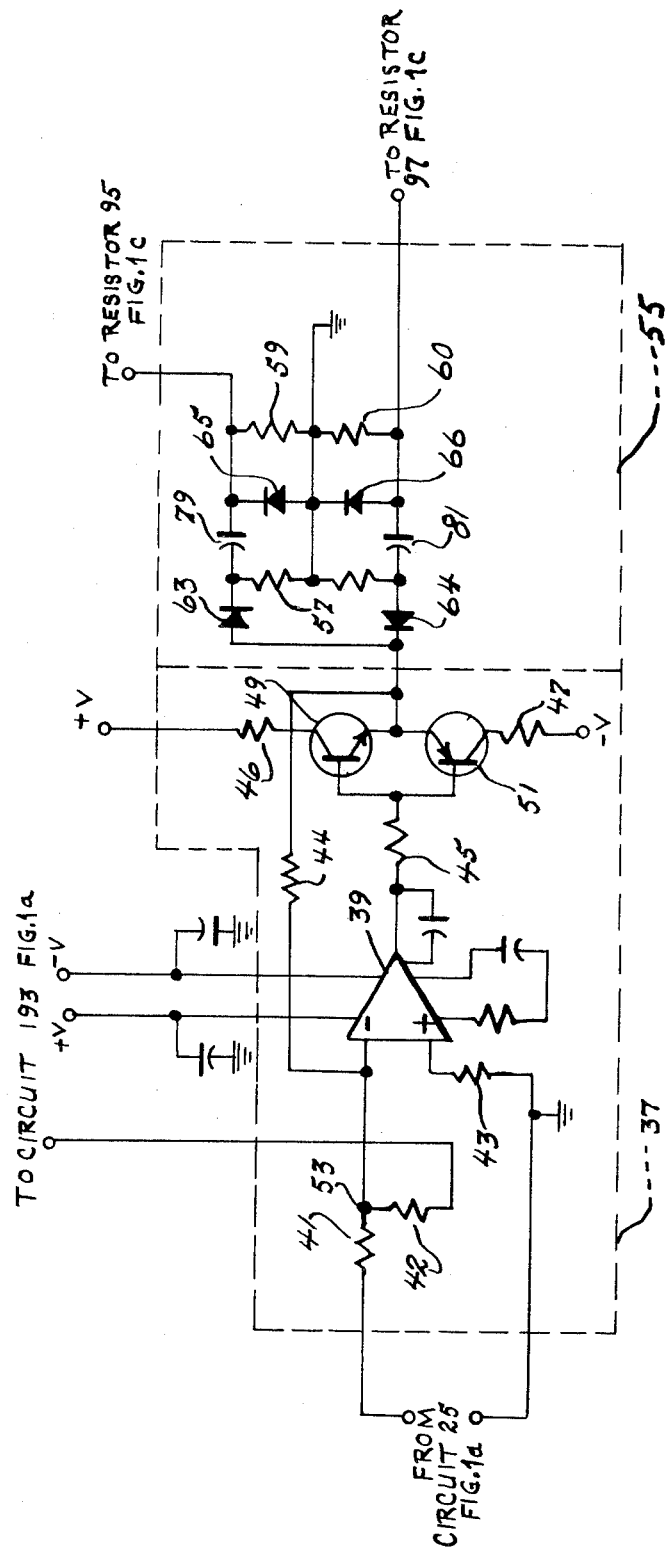

The positive and negative pulses from forward summing amplifier circuit 37 are coupled to DC restoration network 55 which includes resistors 57–60, diodes 63–66, and capacitors 79 and 81. DC restoration network 55 prevents DC coupling between forward summing amplifier circuit 37 and integrator 83 and to maintain pulse levels relative to ground.

The output from DC restoration network 55 is coupled to operational amplifier integrator 83 which includes operational amplifier 85, resistors 87–89, and transistors 91 and 93 in a forward loop. The input network to this stage includes resistors 95, 97, and 99.

Feedback network 100 is comprised of resistors 101 and capacitors 103–105. Resistors 107 and 109 comprise a DC balance adjustment and resistors 111 and 113 are used to balance input impedances in order to maintain DC drift as a function of temperature to a minimum.

Field effect transistor 115, diode 117, and resistor 119 comprise a field effect transistor switch 116, and field effect transistor 121, diode 123, and resistor 125 comprise field effect transistor switch 126. These two switches are used to return the output of the integrator 83 to zero on command and without a significant transient at the output as a result of field effect transistor 121 switching the combination of capacitors 127 and 129 to the grounded side of integrator 83. Three other field effect transistor switches 132, 134 and 136 comprise respectively field effect transistor 131, diode 133, and resistor 135; field effect transistor 137, diode 139, and resistor 141; and field effect transistor 143, diode 145, and resistor 147.

The function of field effect transistors 131 and 137 is to change the time constant of integrator 83 with field effect transistor 131 changing the input impedance by shorting out resistor 99 and field effect transistor 137 changing the feedback impedance by switching in the combination of capacitors 103 and 104. Field effect transistor 143 shorts out resistor 111 in order to maintain balance input impedance for operational amplifier 85 and this change occurs on command.

The return to zero command drive 148 is comprised of resistors 149–152, transistors 155 and 157, and diode 159.

The time constant change command driver 160 is comprised of resistors 161–163, resistors 165–167, transistors 169–171, and diode 173.

The DC output of integrator 83 is coupled to feedback amplifier 174 which includes amplifier 175, transistors 179 and 181, and resistors 183 and 185 in the forward loop. Resistor 187 is used for the feedback impedance and resistor 189 is used as the input impedance.

Resistor 191 serves to balance the input impedance of the amplifier which can have a gain of three (3).

The output of feedback amplifier 174 is coupled to feedback analog gate 193, which includes transistors 195 and 197, transistors 199 and 201, and diodes 203–206. The analog gate is controlled by analog gate switch driver 218 which includes resistors 209–214, transistors 217 and 219, and capacitors 221–223.

The analog gate time and length of switching is controlled by resettable monostable multivibrator 225 which includes amplifier 23, resistors 227–232, Zener diodes 235–237, transistors 239 and 241, diode 243, and capacitors 245–247.

The output of integrator 33 is also coupled to two threshold circuits 249 and 261. Circuit 249 is comprised of amplifier 251, resistors 253 and 256, and Zener diode 259. The second threshold circuit 261 is comprised of amplifier 263, resistors 265 and 269, and Zener diode 273. Either circuit may be set to provide switching command decisions for specific levels of decorrelation voltage.

The amplifiers in the above circuits are biased by Zener diode power supply 275.

What is claimed is:

1. A tracking system for determining correlation between incoming data signals and memory data signals, comprising:
   a. an exclusive OR circuit fed by the incoming data signals and the memory data signals;
   b. a monostable multivibrator fed by the exclusive OR gate;
   c. an AND gate fed by the monostable multivibrator and the exclusive OR gate;
   d. a feedback analog gate fed by the monostable multivibrator;
   e. a summing amplifier fed by the feedback analog gate and the AND gate; and
   f. an integrating circuit fed by the summing amplifier the output thereof being the correlation and is fed back to the feedback analog gate.

2. A tracking system according to claim 1 which further comprises a clamping circuit interposed between the AND gate and the summing amplifier.

3. A tracking system according to claim 2 which further comprises a DC restoration network interposed between the summing amplifier and the integrating circuit for eliminating DC coupling therebetween.

* * * * *